United States Patent
Morifuji

[19]

[11] Patent Number: 6,052,114
[45] Date of Patent: Apr. 18, 2000

[54] VIRTUAL REALITY BODY-SENSING APPARATUS

[75] Inventor: Hiroaki Morifuji, Tokyo, Japan

[73] Assignee: NEC Corporation, Tokyo, Japan

[21] Appl. No.: 09/102,643

[22] Filed: Jun. 23, 1998

[30] Foreign Application Priority Data

Jun. 23, 1997 [JP] Japan .................................... 9-165499

[51] Int. Cl.⁷ .................................................... G09G 5/08
[52] U.S. Cl. .......................................... 345/158; 345/156
[58] Field of Search .................................. 345/158, 157, 345/156

[56] References Cited

U.S. PATENT DOCUMENTS

| | | | |
|---|---|---|---|
| 5,323,174 | 6/1994 | Klapman et al. | 345/156 |
| 5,791,351 | 8/1998 | Curchod | 128/782 |
| 5,905,487 | 5/1999 | Kwon | 345/158 |
| 5,980,256 | 11/1999 | Carmein | 434/55 |
| 5,982,352 | 11/1999 | Pryor | 345/156 |

FOREIGN PATENT DOCUMENTS 4-253877  9/1992  Japan .
4-295379  10/1992  Japan .

*Primary Examiner*—Richard A. Hjerpe
*Assistant Examiner*—Ronald Laneau
*Attorney, Agent, or Firm*—Young & Thompson

[57] ABSTRACT

A virtual reality body-sensing apparatus easily interchanges information between the real world and a virtual world. The apparatus has a base portion, a swing arm portion, a rotary swing arm portion, a body-sensing portion, a swing drive portion, and a monitor screen. The apparatus detects the user's motions such as a direction of travel angle, an edge angle, a twist angle, and a load ratio, and regenerates the inclination of a skiing hill in the virtual world by swinging the body-sensing portion.

12 Claims, 11 Drawing Sheets

VIRTUAL REALITY BODY-SENSING APPARATUS

BACKGROUND OF THE INVENTION

1. Field of the Invention

The present invention relates to a virtual reality body-sensing apparatus, especially for a simulator, a virtual reality game, a sport training apparatus or the like.

2. Description of the Related Art

A virtual body-sensing apparatus is an apparatus for sensing movements of a user as if the user is in a three-dimensional virtual world in a real time manner. The apparatus requires functions for transmitting the user's body motion to a controlling CPU (central processing unit) for controlling the virtual world in a real time manner and for transmitting virtual reality information generated in the controlling CPU to the user in a real time manner.

In the conventional virtual body-sensing apparatus, to transmit the user's body motion to the apparatus, the user moves his body so that the user's motion is changed in the virtual world, and this means that, for example, a vehicle being ridden by the user in the virtual world is manipulated. Thus, the motion of the vehicle for the user in the virtual world is changed.

Japanese KOKAI No. 4-295,379 (published on Oct. 20, 1992) discloses a ski simulator having a video projector, a screen, a projector controller, a conveyer controller, and a belt conveyer. The user actually puts on a pair of skis, then the user actually slides on the belt conveyer.

Japanese KOKAI No. 4-253,877 (published on Sep. 9, 1992) discloses a ski jump simulator having calculators, an interface, a screen, a driving arm, cables, an acceptor, an approach, and an arm controller. The user is actually suspended by the cables from a ceiling and the user actually puts on a pair of skis, then the user feels a change of position by the raising and lowering of the cables.

However, to transmit the user's body motion to the apparatus, a large sensing device such as a magnetic sensor, an infrared sensor or the like is required.

Moreover, to transmit the virtual reality information to the user in a real time manner, it is necessary to move a riding stage of the vehicle in a three dimensional manner so that the riding stage of the virtual body-sensing apparatus regenerates the motion of the vehicle in the virtual world.

However, to transmit the virtual reality information, a large driving device such as a hydraulic device or the like is required. If a simple structure is used, it is difficult to cause the user to experience the virtual reality information in a realistic manner.

Moreover, it is difficult to provide different modes for generating the virtual reality information differently according to the users' ages, for example, for young people, to provide a mode transmitting the virtual reality information, and for infants or elderly people, to provide another mode transmitting the virtual reality information differently or not at all.

Furthermore, whenever the type of game is changed, much modification is required for the apparatus.

SUMMARY OF THE INVENTION

An object of the present invention is to provide a virtual reality body-sensing apparatus that can generate a virtual world similar to a real world, with a simple structure.

Another object of the present invention is to provide a virtual body-sensing apparatus that can readily convert between a mode transmitting virtual reality information and a mode not transmitting such information, using the same virtual body-sensing apparatus.

Another object of the present invention is to provide a virtual body-sensing apparatus that easily accommodates the changing of the types of games.

To realize these objects, the present invention provides an apparatus comprising a base portion, a swing arm portion joined to the base portion for freely swinging relative to the base portion, a rotary swing arm portion joined to the swing arm portion for freely rotating relative to the swing arm portion about a vertical line passing through the swing arm portion, a body-sensing portion for receiving a user riding thereon and which is provided on an opposite end of the rotary swing arm portion, and a sensor for detecting the condition of the body-sensing portion.

The sensor may detect any one or more of the following input parameters:

the rotation angle of the rotary swing arm portion as a forwarding direction;

a rotation angle about a line parallel to the centerline of the body-sensing portion ("edge angle");

a rotation angle of the user's foot about a vertical line passing through the body-sensing portion ("twist angle"); and the location of the center of gravity of the user riding on the body-sensing portion.

The apparatus further comprises a swing drive portion for swinging the opposite end of the swing arm portion, an image display portion for displaying a virtual image, and a control portion for receiving data from the sensor and for controlling the swing drive portion and the image display portion.

DETAILED DESCRIPTION OF PREFERRED EMBODIMENTS

Figure 1:
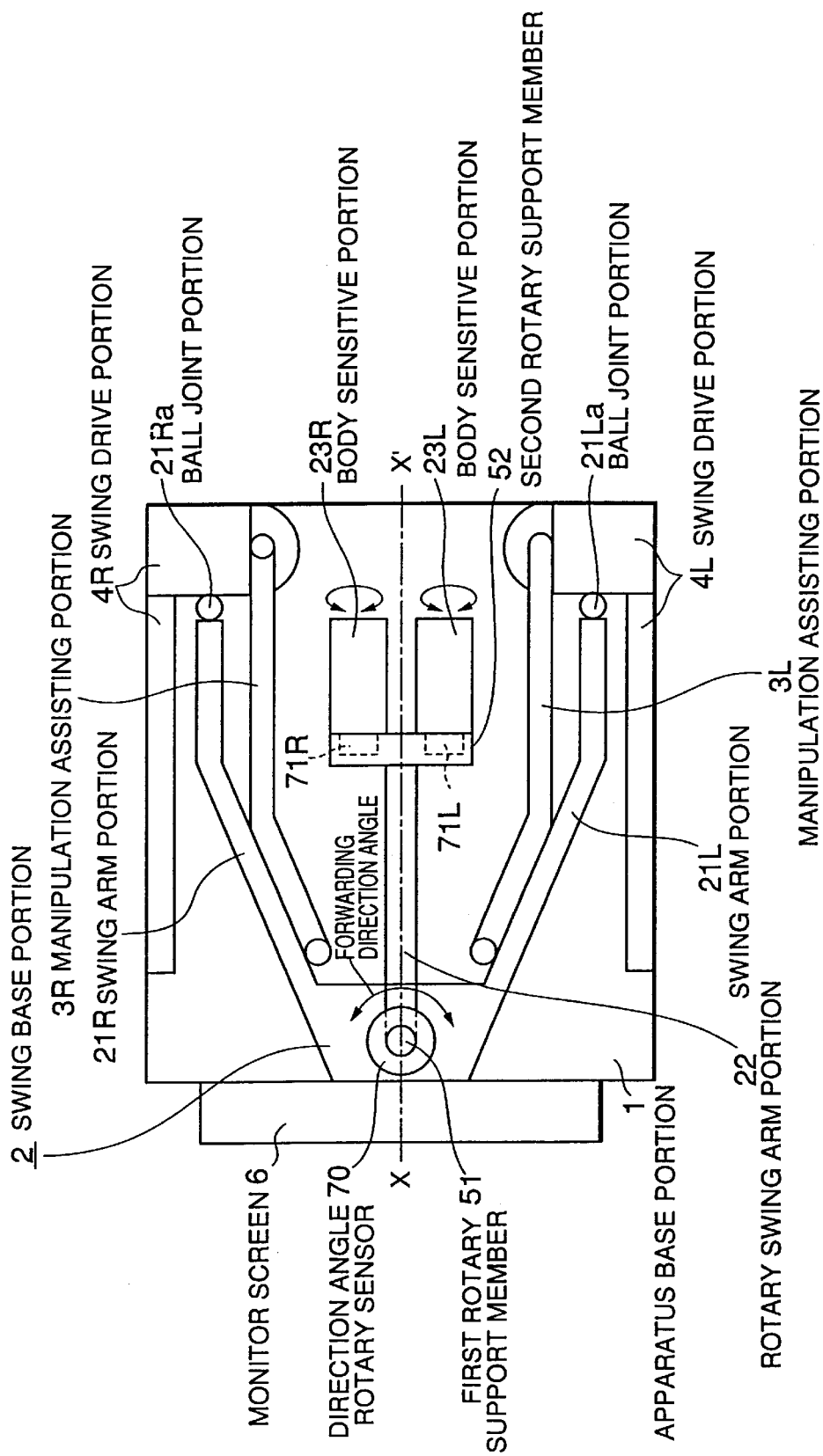
FIG. 1 is a plan view showing the virtual body-sensing apparatus according to an embodiment of the present invention.
Figure 2:
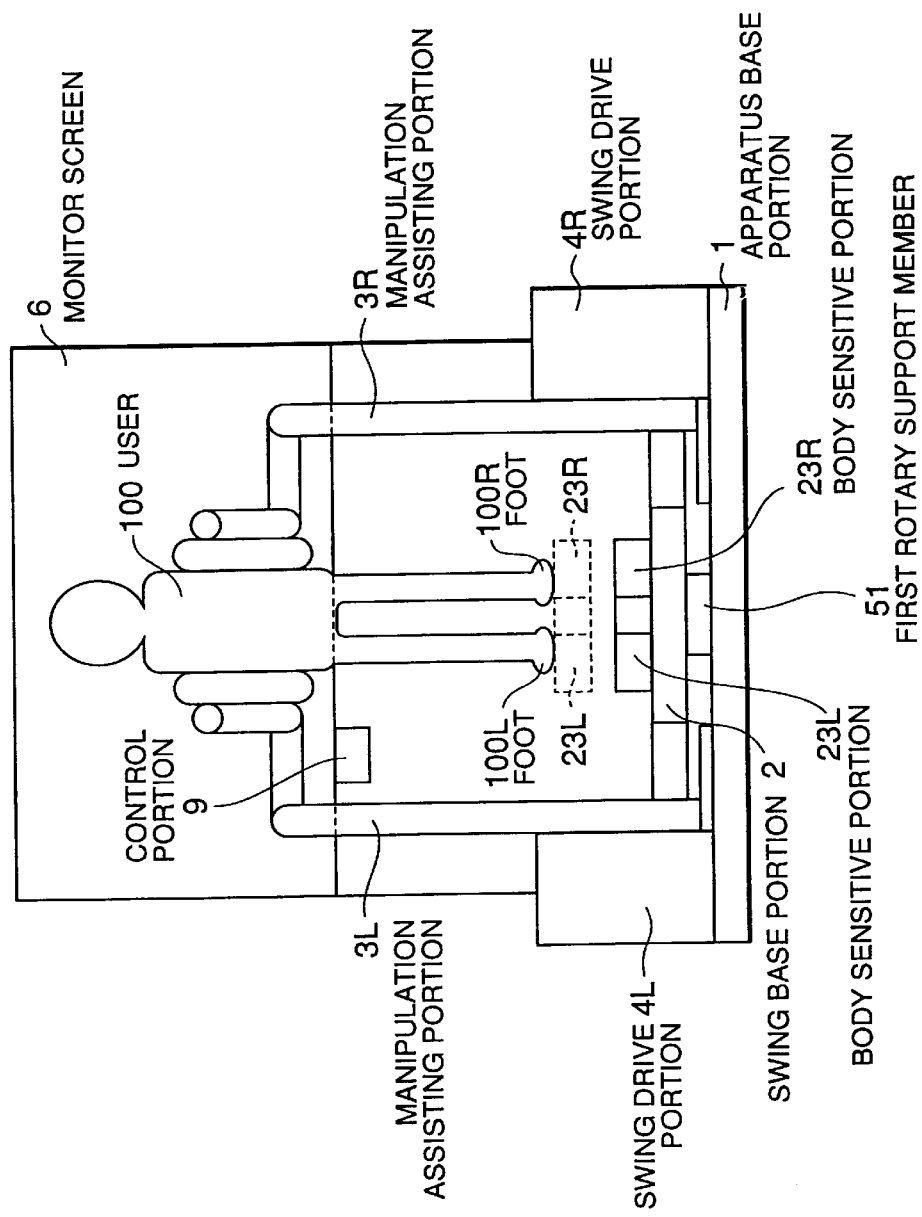
FIG. 2 is a rear view showing the virtual body-sensing apparatus according to the FIG. 1 embodiment.
Figure 3:
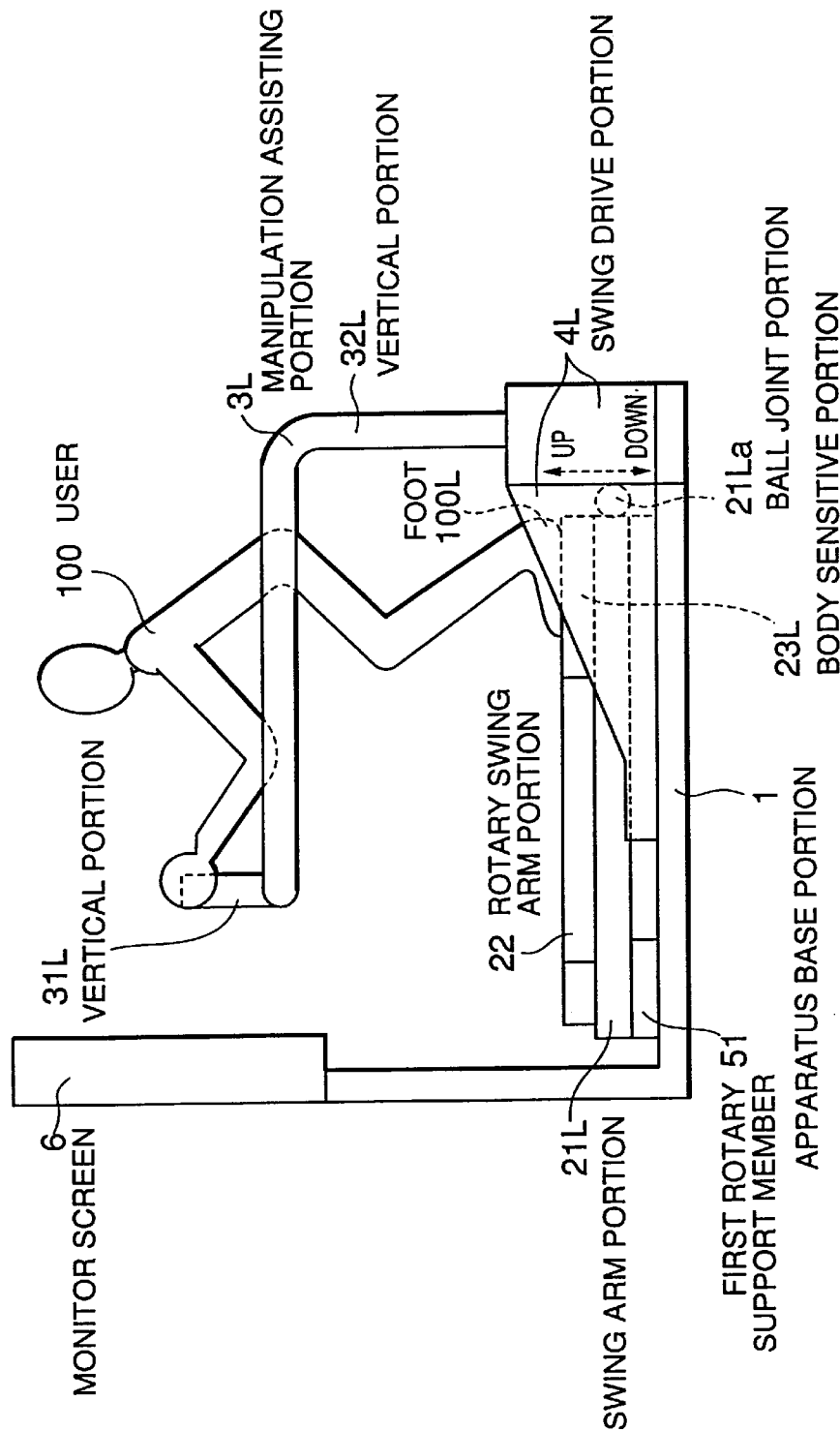
FIG. 3 is a side view showing the virtual body-sensing apparatus according to the FIG. 1 embodiment.

In FIGS. 1 to 3, the virtual body-sensing apparatus mainly comprises an apparatus base portion 1, a wing base portion 2, manipulation assisting portions 3L, 3R, swing drive portions 4L, 4R, and a monitor screen 6.

The apparatus base portion 1 has a rectangular plate-like shape and is horizontally placed on the ground.

The swing base portion 2 has a V-shape whose upper sides are parallel with each other. The apex of the V-shape is located at a left-central position on the apparatus base portion 1 as shown in FIG. 1. The swing base portion 2 is joined to the apparatus base portion 1 through a first rotary support member 51 for free rotation thereabout.

Each manipulation assisting portion 3L, 3R comprises a parallel bar passing through a respective side of the swing base portion 2. Each upper end of the manipulation assisting portions 3L, 3R has a vertical portion 31L, 31R which is gripped by the user 100 as a pair of ski poles. Each lower end of the manipulation assisting portions 3L, 3R has a vertical portion 32L, 32R fixed to the apparatus base portion 1.

The swing drive portions 4L, 4R are fixed to the apparatus base portion 1. Each joint portion 21L$a$, 21R$a$ is connected to a corresponding swing drive portion 4L, 4R.

The monitor screen 6 is an image display device displaying a virtual reality image.

The swing base portion 2 is composed of swing arm portions 21L, 21R, a rotary swing arm portion 22, and body-sensing portions 23L, 23R.

The swing arm portions 21L, 21R are formed as a V-shaped frame that is horizontally mounted and defines both ends and a side surface including the bottom side of the swing base portion 2 and is symmetrical about line X-X'. One end of the rotary swing arm portion 22 is mounted on a first rotary support member head portion 54 of the first rotary support member 51, whose head projects from a top surface of the apparatus base portion 1.

Thus, the swing base portion 2 is freely rotatable about the symmetrical line X-X' and about a horizontal line perpendicular to the symmetrical line X-X' passing through the first rotary support member 51. Each swing drive portion 4L, 4R, swings the swing arm portion 21L, 21R up and down independently at two positions.

The rotary swing arm portion 22 is freely joined to one end of each swing arm portion 21L, 21R at the apex of the isosceles triangle described by swing base portion 2, through the first rotary support member 51.

The first rotary support member 51 is thus located at the apex of an isosceles triangle formed by the swing arm portions 21L, 21R. Each joint portion 21L$a$, 21R$a$ of the swing arm portions 21L, 21R is located at a respective end of the swing arm portion 21L, 21R.

Figure 4:
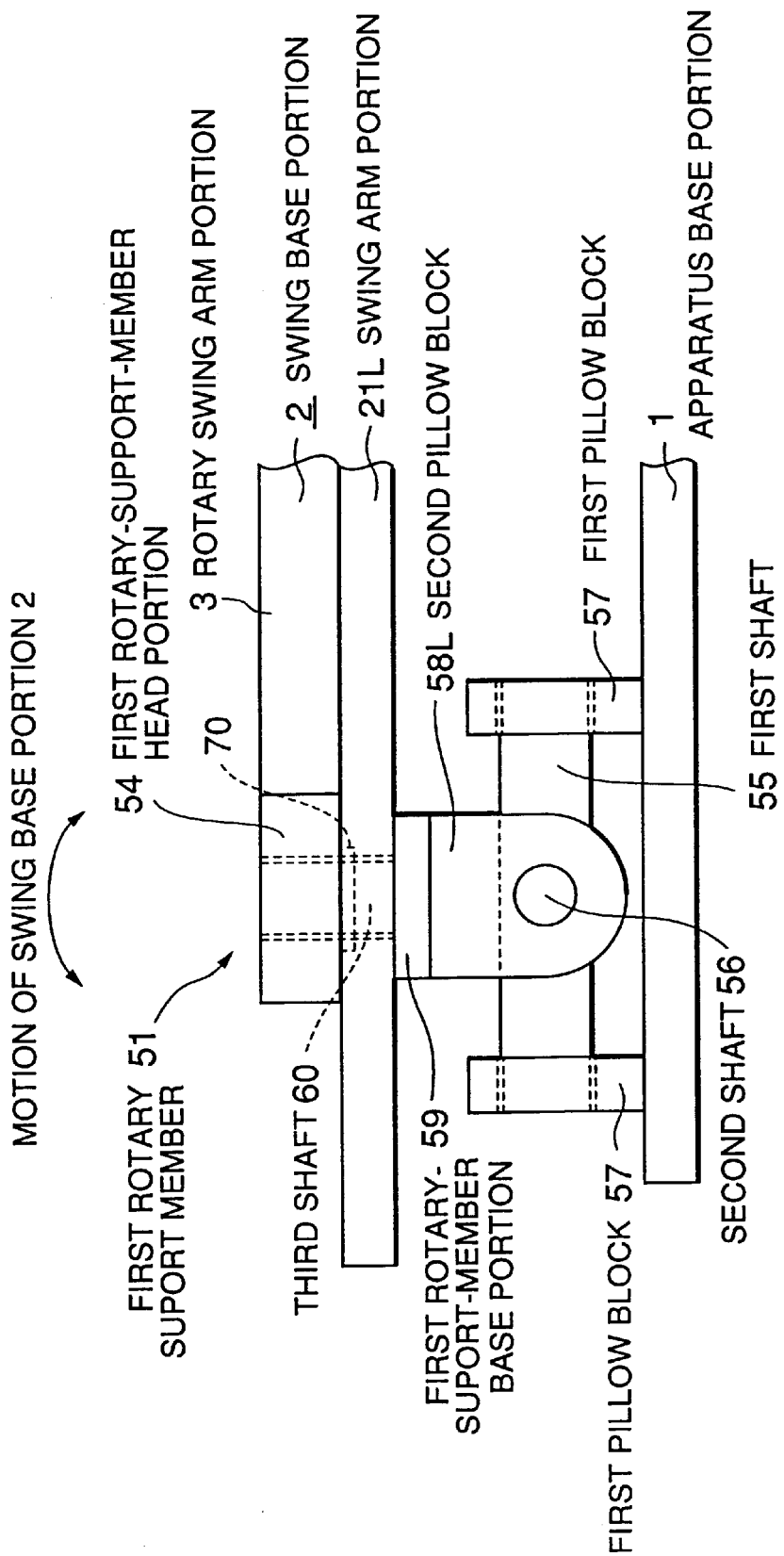
FIG. 4 is a side view showing one example of the first rotary support member according to the FIG. 1 embodiment.

In FIG. 4, the first rotary support member 51 has a first shaft 55 disposed in parallel with the apparatus base portion 1. The ends of the first shaft 55 are mounted in a first pillow block 57. The first pillow block 57 is fixed to the apparatus base portion 1. A second shaft 56 having a smaller diameter than the diameter of the first shaft 55 is inserted into shaft 55 so as to be perpendicular to the central portion of the first shaft 55.

Figure 5:
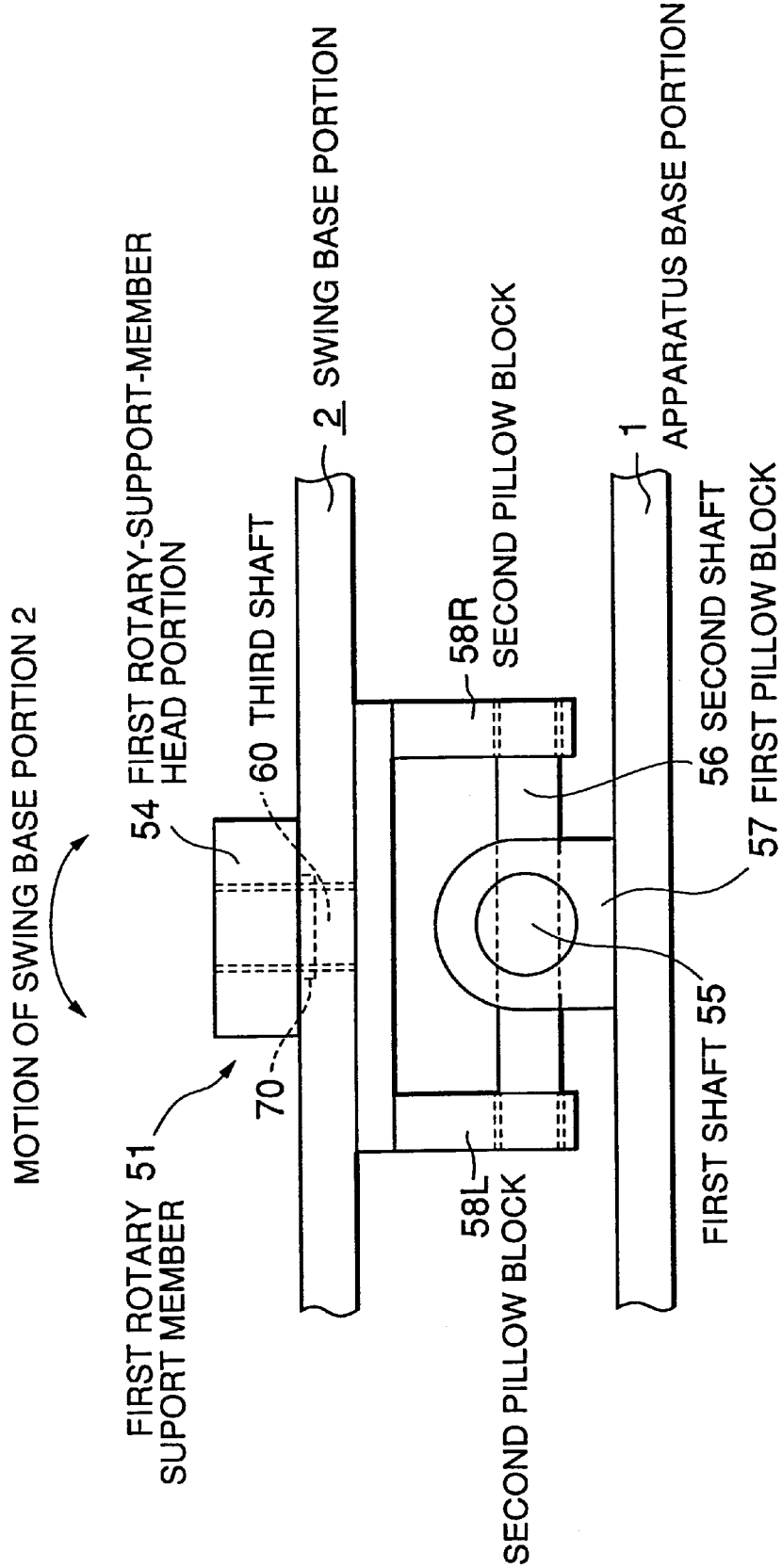
FIG. 5 is a front view showing another example of the first rotary support member according to the FIG. 1 embodiment.

In FIG. 5, the ends of the second shaft 56 are mounted in a second pillow block 58L, 58R. The second pillow block 58L, 58R is fixed to the first rotary support member base portion 59 disposed above the second pillow block 58L, 58R. A third shaft 60 projects upwardly from a central portion of an upper surface of the first rotary support member base portion 59. A first rotary support member head portion 54 is mounted on the swing base portion 2 through a roller bearing. The first rotary-support member base portion 59 is fixedly mounted on the bottom of the swing base portion 2.

The rotary swing arm portion 22 thus freely rotates about a vertical line passing through the first rotary support member 51. The first rotary support member 51 incorporates a direction angle rotary sensor 70 for detecting a forwarding angle of the rotary swing arm 22 around the third shaft 60.

The second rotary support member 52 is mounted on the rotary swing arm portion 22 at a central portion of the second support member 52 and at the end of the rotary swing arm portion 22 opposite support member 51. Each body-sensing portion 23L, 23R is mounted on the second rotary support member 52 for rotation about axes parallel to X-X'. The longitudinal centerlines of the body-sensing portions 23L, 23R are preferably disposed in the same horizontal plane. The second rotary support member 52 comprises roller bearings or the like to freely support each body-sensing portion 23L, 23R.

Figure 6:
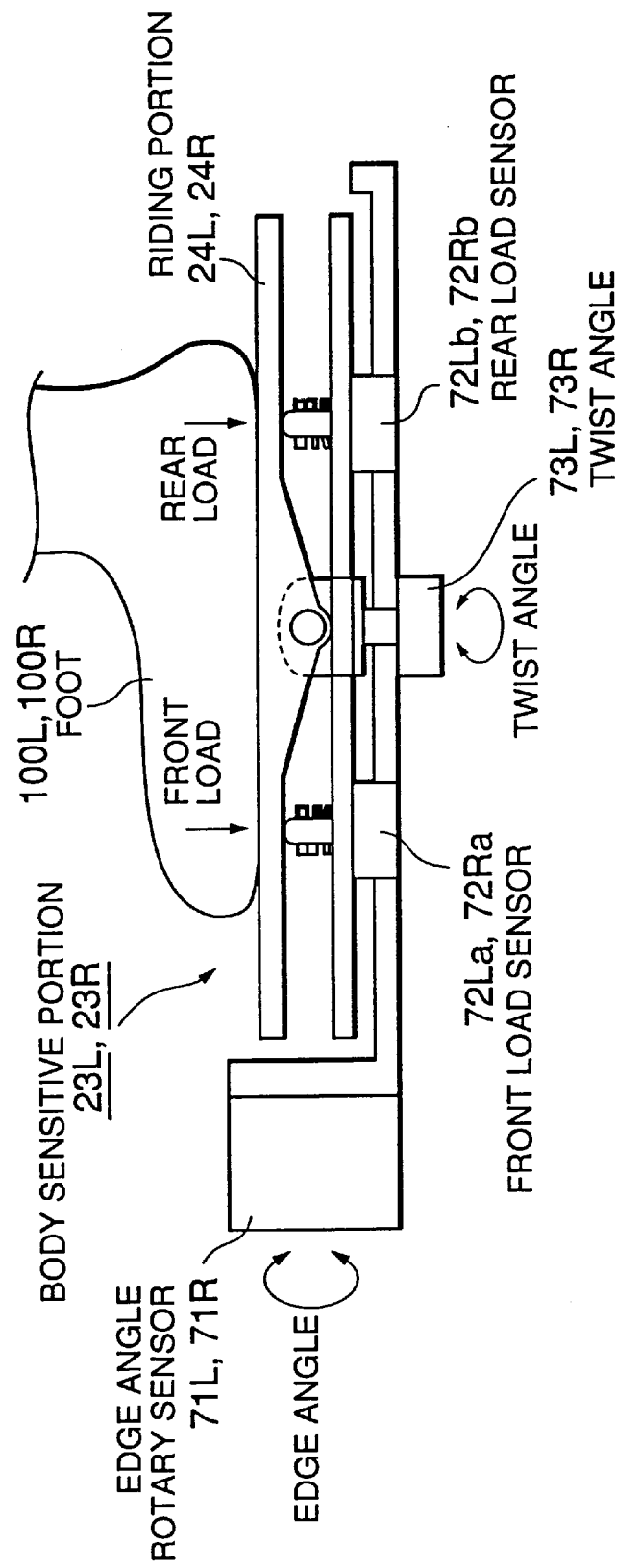
FIG. 6 is a side view showing an example of the body-sensing portion of the virtual body-sensing apparatus according to the FIG. 1 embodiment.
Figure 7:
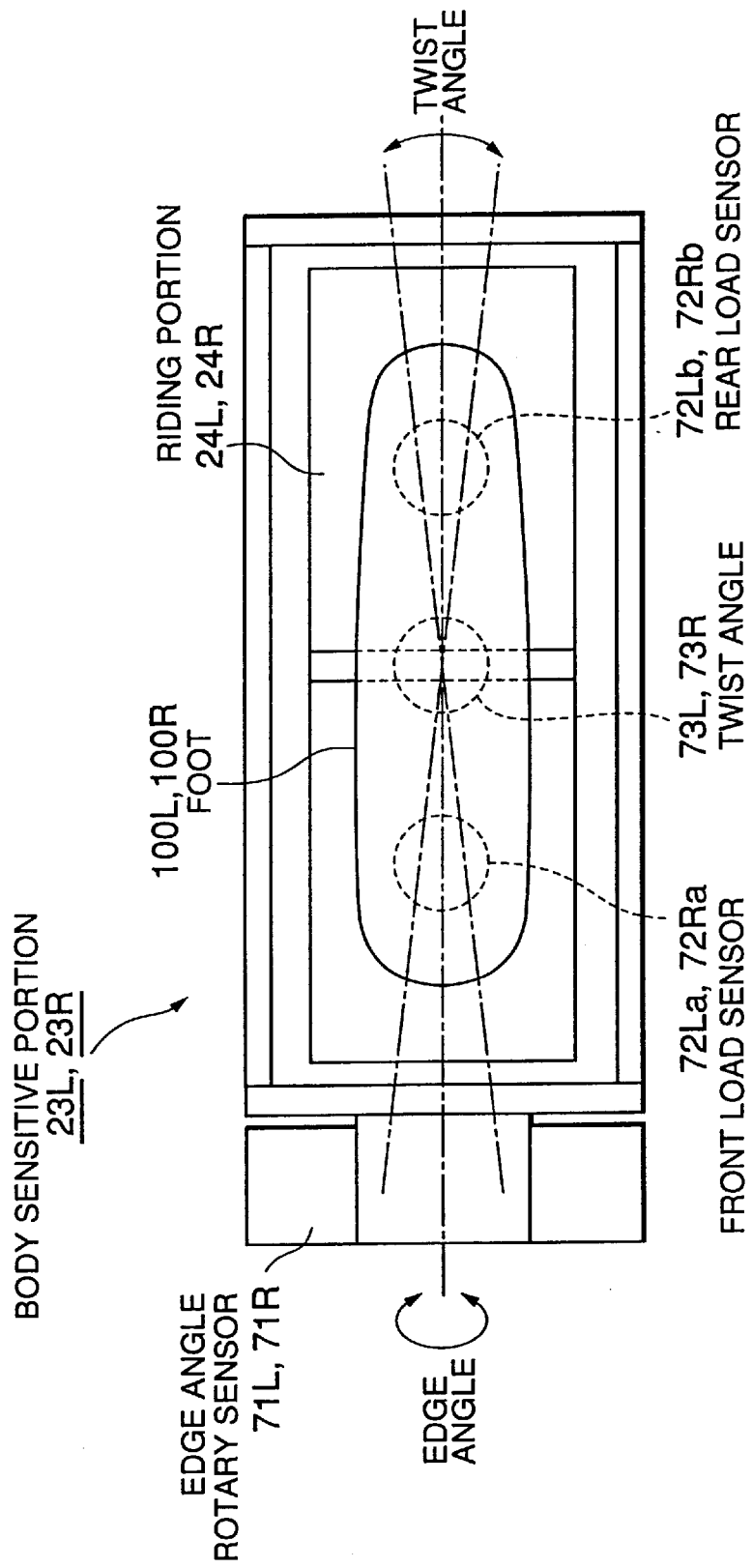
FIG. 7 is a plan view of the FIG. 6 structure.
Figure 8:
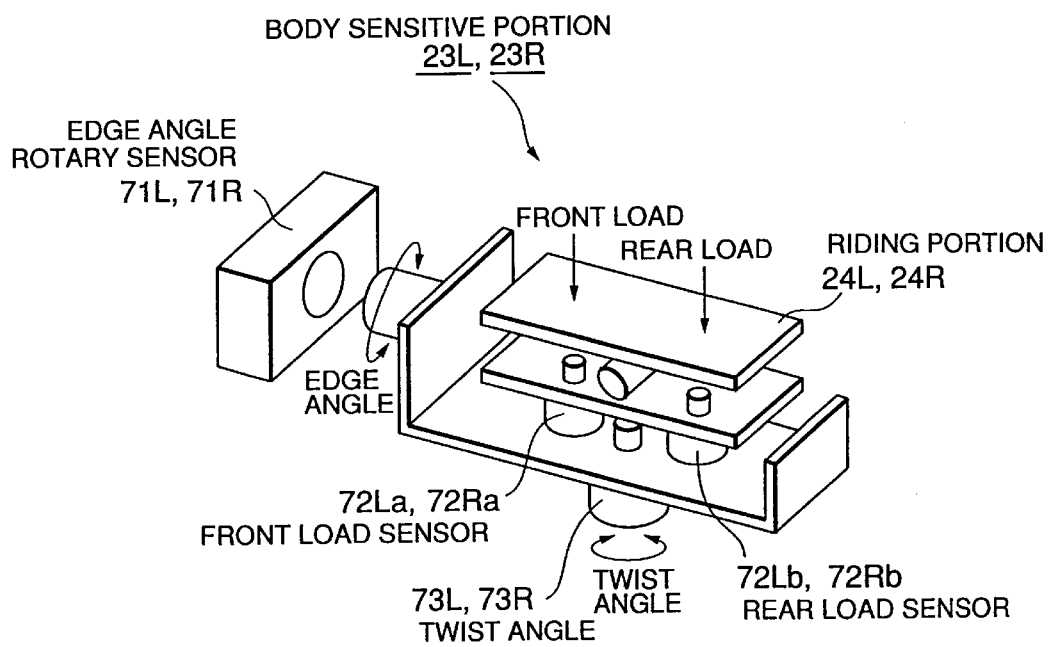
FIG. 8 is a perspective view of the FIG. 6 structure.

In FIGS. 6 to 8, each body-sensing portion 23L, 23R comprises a riding portion 24L, 24R, an edge angle rotary sensor 71L, 71R, a front load sensor 72L$a$, 72R$a$, a rear load sensor 72R$a$, 72R$b$, and a twist angle rotary sensor 73L, 73R.

Riding portions 24L, 24R receive the user's feet 100L, 100R. Edge angle rotary sensors 71L, 71R detect the rotation angle about a longitudinal centerline of body-sensing portions 23L, 23R. Load sensors 72L$a$, 72L$b$, 72R$a$, 72R$b$ contact the bottom surfaces of the riding portions 24L, 24R at points along their longitudinal centerlines. Twist angle rotary sensors 73L, 73R detect the rotation angle about vertical lines passing through the center of riding portions 24L, 24R.

Each movement of either of the body-sensing portions 23L, 23R may thus generate one or more of the following angular displacements:

(A) rotation about a vertical line passing through the first rotary support member 51, that is a forwarding direction (or direction of travel);

(B) rotation about lines parallel to the longitudinal centerline of the rotary swing arm portion 22, that is, edging of the feet 100L, 100R; and (C) rotation about vertical axes perpendicular to the top surfaces of the body-sensing portion 23L, 23R, that is, twisting of the feet 100L, 100R.

Thus, direction angle rotary sensor 70 (FIG. 1) detects the direction of the riding portions 24L, 24R as the forwarding direction of the skis; whereas edge angle rotary sensors 71L, 71R detect rotation angles about longitudinal axes of the riding portions 24L, 24R as the edge angles of the skis.

The load ratio applied to the riding portions 24L, 24R is detected by the load sensors 72L$a$, 72L$b$ and 72R$a$, 72R$b$. A forward posture of the user 100 is determined when the load of each front load sensor 72L$a$, 72R$a$ is larger than the load of each rear load sensor 72L$b$, 72R$b$.

The twist angle rotary sensors 73L, 73R detect the twist angle in the horizontal plane of the riding portions 24L, 24R as the twist angle of the skis.

The above sensors 70 to 73L, 73R may be embodied as optical rotary encoders, rotary variable resistors, pressure sensors, stress gauges or any other suitable measuring devices.

Figure 9:
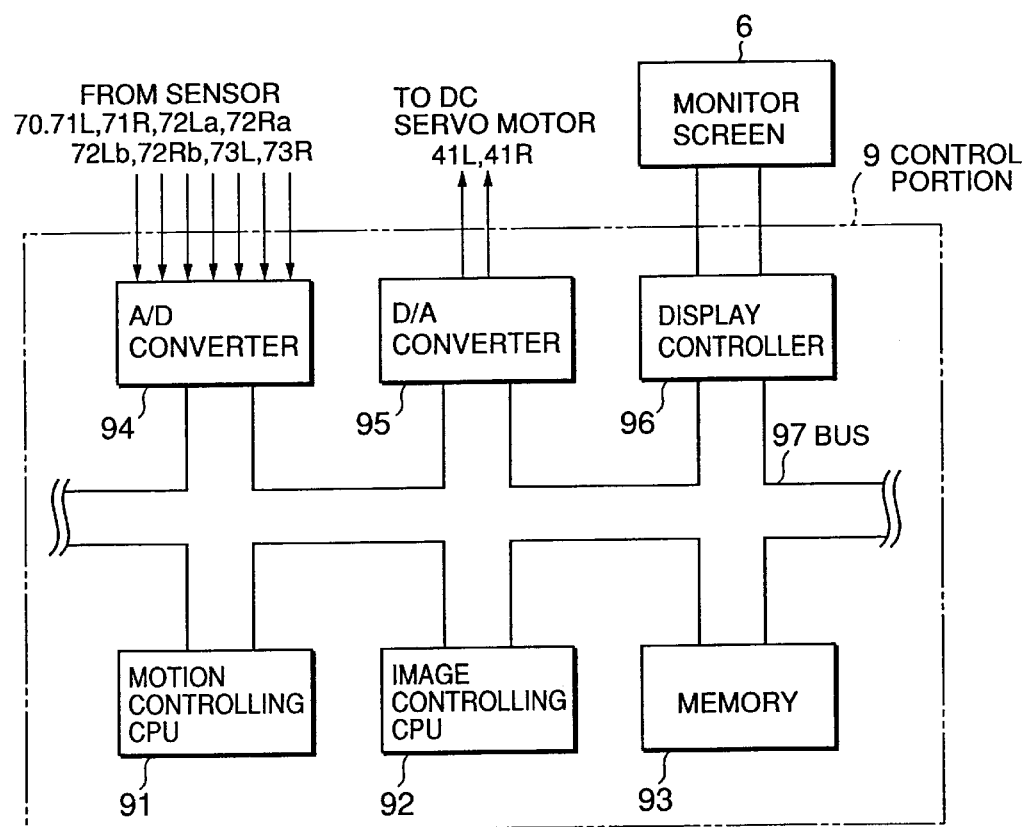
FIG. 9 is a block diagram showing the control portion according to the FIG. 1 embodiment.

In FIG. 9, a control portion 9 comprises a motion control CPU (central processing unit) 91, an image control CPU 92, a memory 93, an A/D converter 94, a D/A converter 95, a display controller 96, and a bus 97.

The motions of the skis in the virtual world are calculated by the motion controlling CPU 91 based on the topographic information, the motion law of the skis in the virtual world stored in the memory 93, and the detected data from the sensors 70 to 73L, 73R.

The motion controlling CPU 91 controls the motions of the body-sensing portions 23L, 23R based on the detected data of the sensors 70 to 73L, 73R and topographical information in the virtual world, image information such as scenes, and motion law of the skis stored in the memory 93.

The motion controlling CPU 91 calculates the change of the posture of the skis which the user 100 would experience based on the motion of the skis in the virtual world, and provides control signals to each swing drive portion 4L, 4R to swing the swing arm portions 21L, 21R.

The image controlling CPU 92 controls the scenes displayed on the monitor screen 6 based on the calculated data from the motion controlling CPU 91, the detected data from the sensors 70 to 73L, 73R, and topographical information in the virtual world stored in the memory 93.

the image controlling CPU 92 generates the scene observed by the user 100 in the virtual world based on the motion of the skis and displays the image information on a monitor screen 6. The motion controlling CPU 91 and the image controlling CPU 92 may be embodied as a single CPU.

The memory 93 stores computer software for controlling the apparatus, topographical information, and the motion law of the virtual world.

The A/D converter 94 converts the signal detected each sensor 70 to 73L, 73R into digital data, whereas the D/A converter 95 converts the motion data calculated by the motion controlling CPU 91 into analog control signals.

The display controller 96 controls the displayed image on the monitor screen 6 as calculated by the image controlling CPU 92.

Bus 97 interconnects the above components 91 to 96.

The motion controlling CPU 91 receives the values of the above rotation angles (A) to (C) as well as the center of gravity of the user 100, and changes the interrelationship of these values in accordance with the motion law of the skis.

The information detected by the sensors 70 to 73L, 73R is input to A/D converter 94 and converted into digital information. The digital information is processed in the motion controlling CPU 91, then transmitted to the image controlling CPU 92 as positional information. The positional information is converted into scenery information by the image controlling CPU 92, then the scenery information is transmitted to the display controller 96. Thus, a three-dimensional virtual image in the virtual world is displayed on the monitor screen 6 controlled by the display controller 96 in a real time manner.

Figure 10:
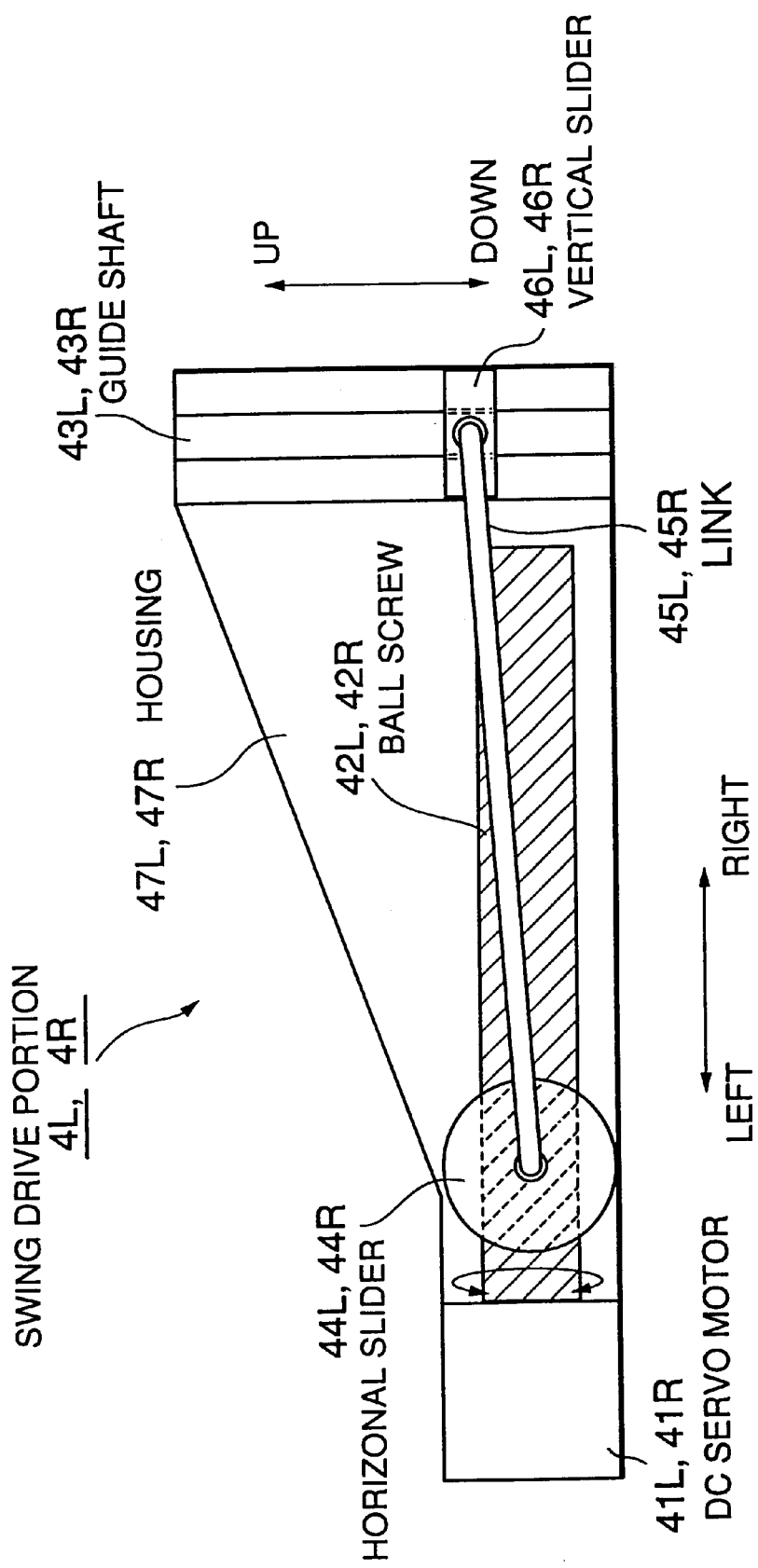
FIG. 10 is a side view showing an example of the swing drive portion of the virtual body-sensing apparatus according to the FIG. 1 embodiment.

In FIG. 10, swing drive portions 4L, 4R swing respective swing arm portions 21L, 23R joined to vertical sliders 46L, 46R up and down in order to virtually realize the change in slope of skis due to the slope or the projection. Thus each swing drive portion 4L, 4R comprises a DC servo motor 41L, 41R, a ball screw 42L, 42R, a guide shaft 43L, 43R, a horizontal slider 44L, 44R, a vertical slider 46L, 46R, and a housing 47L, 47R.

The DC servo motors 41L, 41R and the ball screws 42L, 42R are mounted on the apparatus base portion 1. The guide shafts 43L, 43R extend vertically from the apparatus base portion 1. When DC servo motor 41L, 41R rotates, corresponding ball screw 42L, 42R also rotates. According to the rotational direction of the ball screws 42L, 42R, horizontal sliders 44L, 44R are in turn moved rightward or leftward.

Vertical sliders 46L, 46R, supported by respective guide shafts 43L, 43R, move upward or downward along shafts 43L, 43R. Horizontal sliders 44L, 44R and vertical sliders 46L, 46R are interconnected by links 45L, 45R. The right-and-left motion in the horizontal direction of the horizontal sliders 44L, 44R is thus translated into up-and-down motion of the vertical sliders 46L, 46R. If either horizontal slider 44L, 44R is moved leftward, the corresponding vertical slider 46L, 46R is moved downward. Components 41L, 41R to 46L, 46R of the swing drive portions 4L, 4R are received in housings 47L, 47R, respectively.

Vertical sliders 46L, 46R are connected to joint portion 21La, 21Ra. Thus, if the vertical sliders 46L, 46R are moved up and down, the joint portions 21La, 21Ra of the swing arm portions 21L, 21R are swung up and down.

Swing drive portions 4L, 4R are driven so as to regenerate the slope angle in the virtual world and to regenerate the change of the inclination of the slope based on the body motion of the user 100, including the edge angles, load ratios, twist angles, and the forwarding direction angle of the rotary swing arm 22.

The inclination of the slope in the virtual world is regenerated by the inclination of the swing arm portions 21L, 21R relative to the apparatus base portion 1. The topographical virtual world information generated by the motion controlling CPU 91 is transmitted to the DC servo motors 41L, 41R after the D/A conversion by the D/A converter 95. Each DC servo motor 41L, 41R of the swing drive portions 4L, 4R rotates forward or backward according to the information to swing up and down the swing drive portions 4L, 4R. Thus joint portions 21La, 21Ra of the swing arm portions 21L, 21R are swung up and down in a real time manner.

The skis in the virtual world are manipulated by the user 100 moving his body in the real world, resulting in the movement of body-sensing portions 23L, 23R as detected by sensors 70 to 73L, 73R.

This data of the forwarding direction angle, edge angle, twist angle, and load ratios of the skis by the body motion of the user 100 is processed in the motion controlling CPU 91 so that the motion of the body-sensing portions 23L, 23R causes the same motion obtained when the user 100 is actually skiing.

For example, if the body sensing portions 23L, 23R are rotated clockwise about the first rotary support member 51 from the neutral position in the forwarding direction, this means a left turn. If the edge of the right foot 100R is rotated to the inside, this also means a left turn. If the ski of the right foot 100R twists leftward and the edge of the right foot 100R is effected inside, this also means a left turn. If the load is on the front side, that is, the user 100 assumes a forward slanted posture, this means the edging is effective. On the other hand, if the load is on the rear side, that is, the user 100 takes rearward slanted posture, this means the control is disabled. In this way, the detected motion is quite similar to the actual body motion in skiing.

The motion of the swing arm portions 21L, 21R in the case where the user 100 skis (1) on a level terrain, then (2) down a constant angle slope, and then (3) on another level terrain, will now be described.

(1) When the user 100 skis on level terrain, the swing arm portions 21L, 21R are maintained horizontal.

(2) When the user 100 skis from the level terrain to start skiing downward, the joint portions 21La, 21Ra of the swing arm portions 21L, 21R are quickly raised so that the front side of the body-sensing portions 23L, 23R are lowered so that the posture in which the rear side is raised is taken.

If this condition is maintained while the user 100 skis down the slope, the user 100 has to keep the forward slanted posture and the user 100 feels a heavy load for a long time. To prevent the heavy load, each joint portion 21La, 21Ra of the swing arm portions 21L, 21R is slowly lowered so that each body-sensing portion 23L, 23R returns gradually toward the horizontal. Thus the user 100 feels almost no return motion of the body-sensing portions 23L, 23R since the return motion is slow.

When the swing drive portions 4L, 4R move swing arm portions 21L, 21R, the change of posture which the user 100 would assume in the virtual world may be emphasized and imparted to the user 100. The user 100 will concentrate to manipulate the body-sensing portions 23L, 23R and to see the monitor screen 6, and will thus hardly pay attention to the posture based on the motion in the virtual world and the topography of the virtual world by the body-sensing portions 23L, 23R. Thus, the user 100 can notice only quick changes of the posture of the body-sensing portions 23L, 23R.

When the inclination of the slope in the virtual world displayed on the monitor screen 6 is increased, this is often sufficient by itself for the user 100 sufficiently to feel the inclination of the slope.

(3) When the user 100 has skied down the slope and again reaches level terrain, the joint portions 21La, 21Ra are quickly lowered so that the body-sensing portions 23L, 23R assume a front-up and rear-down posture. Thus the user 100 feels that each ski tip is directed upwardly.

Then the joint portions 21La, 21Ra of the swing arm portion 21L, 21R are slowly raised to return to horizontal. Thus the user 100 feels almost no return motion since the return motion is gradual.

Figure 11:
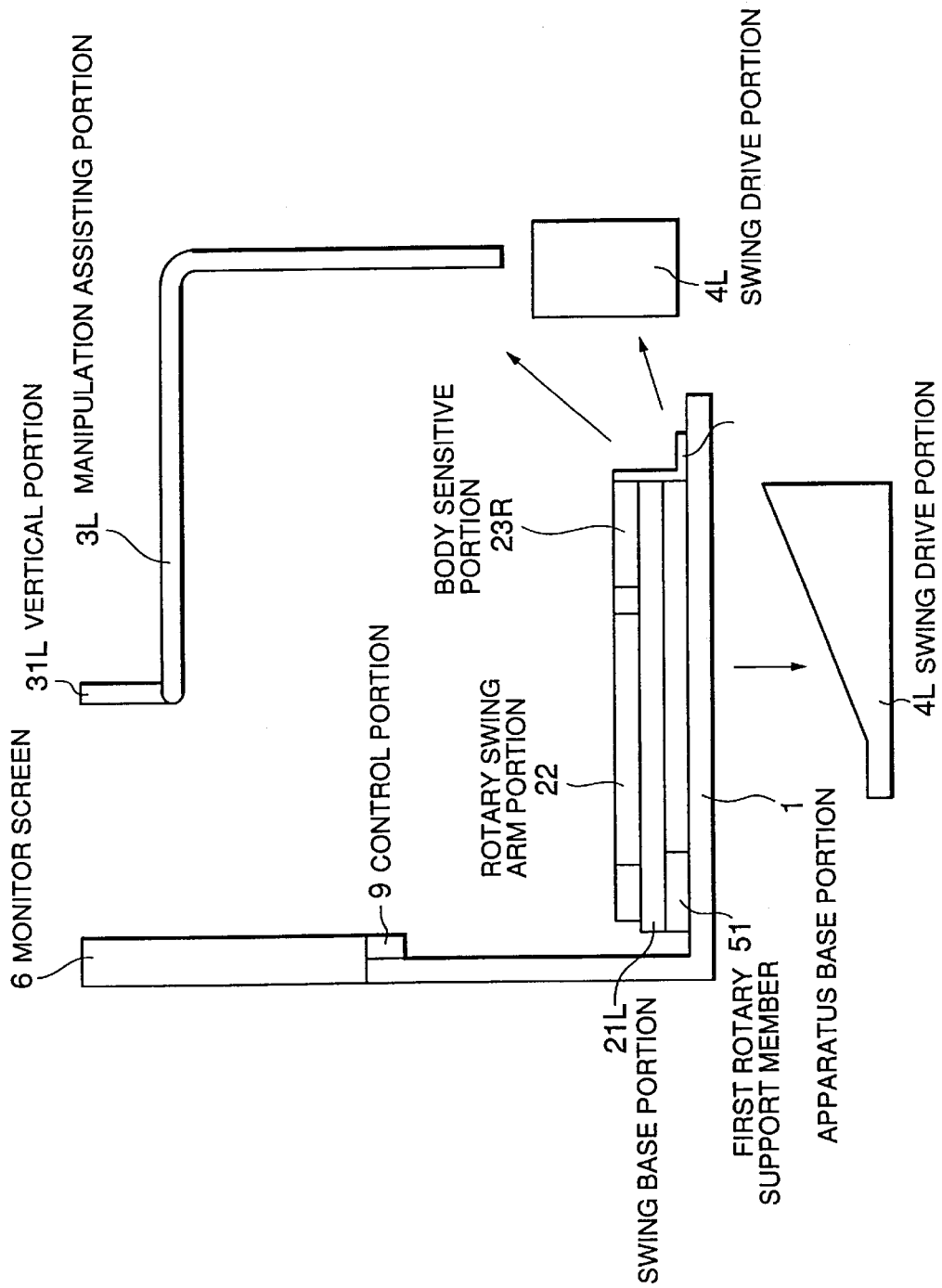
FIG. 11 is an exploded view of the virtual body-sensing apparatus according to the FIG. 1 embodiment.

As shown in FIG. 11, each swing drive portion 4L, 4R is detachable from the apparatus base portion 1. After the swing drive portions 4L, 4R have been removed, the rotary swing arm portion 22 is fastened to the apparatus base portion 1 by a retainer 11. It is thereby possible to provide another mode of operation, which does not transmit the virtual world motion to the user 100. This type may be more suitable for infants, elderly people or the like. The swing drive portions 4L, 4R may be separated into the receiving portion for the DC servo motors 41L, 41R, the ball screws 42L, 42R, the guide shafts 43L, 43R, and the horizontal sliders 44L, 44R.

It is possible to cope with various kinds of games to exchange the body-sensing portions 23L, 23R and the manipulation assisting portions 3L, 3R having different structure and shape according to the types of the games. Thus, the present apparatus is especially suitable for simulation of riding a snow board, a mono ski, jump skis, a parachute, roller skates, ice skates, a kite, a hang-glider, a para-glider, an automotive vehicle, a car, a motorbike, a bicycle, a skate board, water skis, surfing, wind surfing, a body board, jet skis, para-sailing or the like as well as regular snow skiing.

It is possible to detect the user's body motion in a virtual world as a direction of travel, an edge angle, a twist angle, and a front slanted posture in a real time manner, and to transmit virtual reality information to the user in a real time manner, whereby it is possible to experience the virtual world similar in a realistic manner using a simple structure. For example, the user can feel like he is really skiing.

In Alpine skiing, there is competition based on speed. An essential technique is to be able to execute a turn without reducing the speed. In the present invention, the skis are manipulated by the manipulation of the direction of travel, the edge angle, and the twist angle. Thus it is possible to realize three elements of the high-speed Alpine turn, that is, the twisting, the edging, and the pressing. The user thus actually feels that he is skiing while turning on a snow slope with a synergistic effect of the increased speed caused by the forward slanted posture.

The quick change in the posture of the body-sensing portion is preferably exaggerated, because, paradoxically, this has been found to cause the virtual world experienced by the user to be even more realistic. The relatively simple structure provided by the present invention allows this to be easily accomplished. The present invention thus demonstrates that it is possible to simplify the virtual reality apparatus without compromising the body-sensing performance of the virtual world.

In particular in the present invention, the swing arm portion is moved up and down with a simple structure, and the riding stage for the user is smoothly manipulated, which creates a close approximation of the sensation of manipulating actual skis, without the need for the user to be unnaturally conscious of his skis. Thus, the user can pay attention to the change of the posture of the body-sensing portion and the displayed image so that the virtual world is satisfactorily enjoyed by the body.

Moreover, the modular and detachable nature of various of the componentry of the present apparatus allows easily exchanging the parts without a large scale modification to cope with a change in the type of virtual reality game.

Although the present invention has been described in connection with various preferred embodiments thereof, it will be appreciated that those embodiments are provided solely to illustrate the invention, and cannot be construed in a limiting sense. Those skilled in the art will be able to make numerous modifications to the invention based on the disclosure here provided, and all such modifications are considered to fall within the true scope and spirit of the appended claims.

What is claimed is:

1. A virtual reality body-sensing apparatus, comprising:
   a base portion,
   a swing arm portion freely rotatably mounted on said base portion,
   a rotary swing arm portion connected at one end to said arm portion for rotation relative to said swing arm portion freely about a vertical axis passing through said swing arm portion,
   a body-sensing portion for receiving a user, said body-sensing portion being provided on an opposite end of said rotary swing arm portion, and
   a sensor for detecting position and orientations of said body-sensing portion relative to said base portion.

2. The apparatus as defined in claim 1, further comprising a manipulation assisting portion fixed to said apparatus base portion, for supporting said user riding on said body-sensing portion.

3. The apparatus as defined in claim 1, wherein said rotary swing arm portion is rotatably connected to said apparatus base portion.

4. The apparatus as defined in claim 1, wherein said sensor detects a rotation angle of said rotary swing arm portion as a direction of travel.

5. The apparatus as defined in claim 1, wherein said sensor detects a rotation angle about an axis parallel to a longitudinal centerline of said body-sensing portion as an edge angle.

6. The apparatus as defined in claim 1, wherein said sensor detects a rotation angle of said user's foot about a vertical axis passing through said body-sensing portion as a twist angle.

7. The apparatus as defined in claim 1, wherein said sensor detects a position of a center of gravity of said user riding on said body-sensing portion.

8. The apparatus as defined in claim 1, further comprising:
   a wing drive portion for swinging opposite ends of said swing arm portion,
   an image display portion for displaying a virtual image, and
   a control portion for receiving data from said sensor and controlling said swing drive portion and said image display portion.

9. The apparatus as defined in claim 8, wherein said control portion directs said swing drive portion to simulate exaggerated changes in inclination, so that a user riding on said body-sensing portion strongly feels changes of posture of said body-sensing portion.

10. The apparatus as defined in claim 8, wherein said control portion directs said image display portion to display an increasingly steep landscape inclination on a monitor screen, so that said user riding on said body-sensing portion strongly feels change of posture of said body-sensing portion.

11. The apparatus as defined in claim 8, wherein said swing drive portion comprises:
    a motor driven by a control signal from said control portion,
    a horizontal slider connected to said motor and engaging an output gear thereof,
    a ball screw meshing with said horizontal slider,
    a link having one end connected to said ball screw, and
    a vertical slider connected to an opposite end of said link and joined to said swing arm portion.

12. The apparatus as defined in claim 8, wherein said swing drive portion, said manipulation assisting portion, and said body-sensing portion are detachable from said apparatus.

* * * * *